United States Patent Office 3,620,008
Patented Nov. 16, 1971

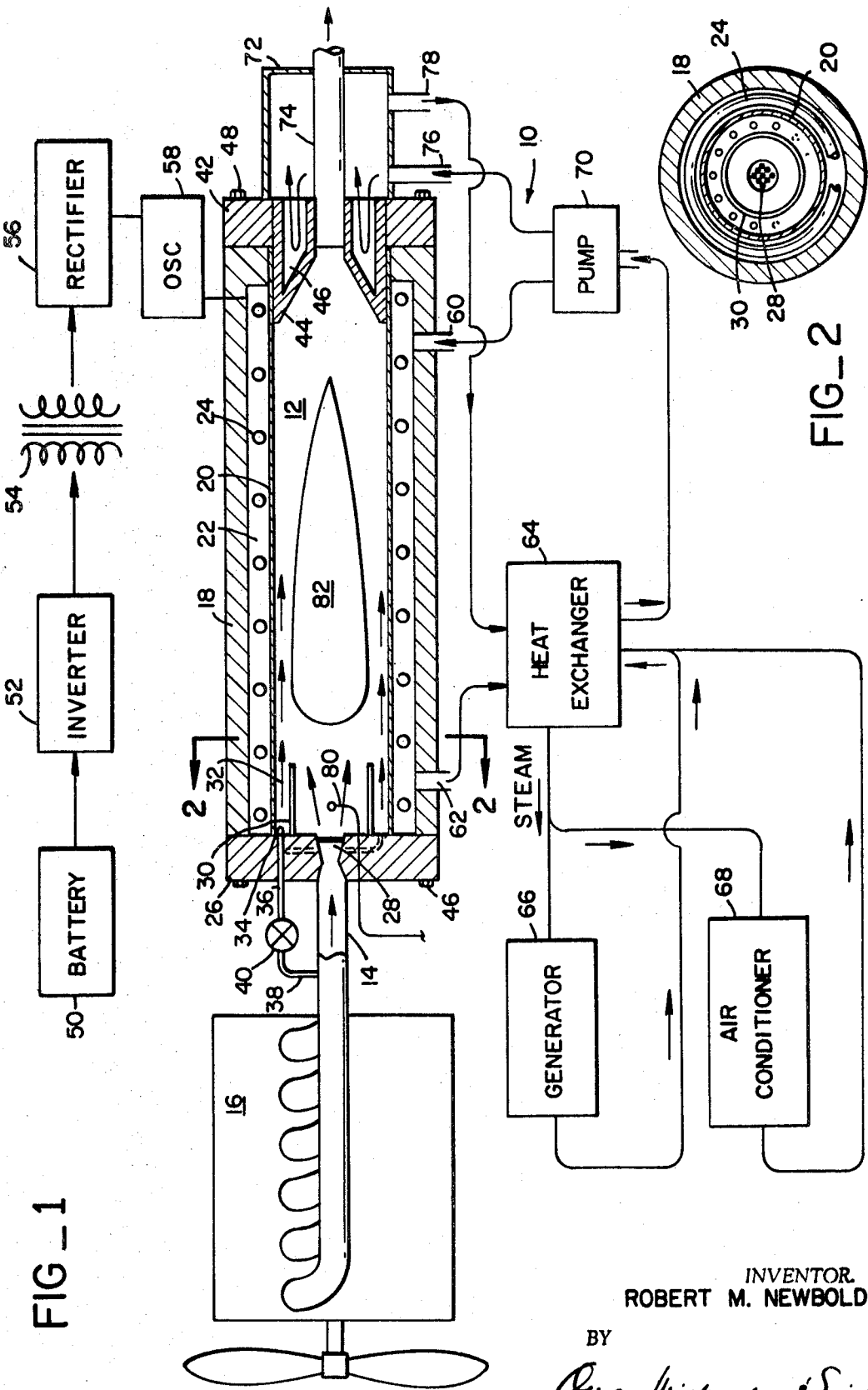

3,620,008
APPARATUS FOR REMOVING AIR POLLUTANTS FROM THE EXHAUST STREAM OF A COMBUSTION PROCESS
Robert M. Newbold, Novato, Calif.
(67 Barbaree Way, Tiburon, Calif. 94920)
Filed July 23, 1970, Ser. No. 57,588
Int. Cl. F01n 3/14; H05h 1/18
U.S. Cl. 60—30                                12 Claims

ABSTRACT OF THE DISCLOSURE

An apparatus for removing pollutants from a combustion exhaust stream comprises a chamber having an inlet for receiving the exhaust stream lined with heat resistant material and surrounded by electrical means providing a high frequency electrical field within the chamber that produces an ignition plasma reaction to ionize the gases in the exhaust stream that flows into the chamber. The plasma of ionized gases within the chamber is at a high temperature and free from air-polluting compounds which are consumed or disassociated. Near the exit of the chamber the ionized gases are cooled and recombined to form harmless compounds such as the normal air gases of nitrogen and oxygen. In an automobile installation the high frequency electrical power is provided through a closed system from a standard battery and heat removed from the ionized gases is utilized for auxiliary power.

---

This invention relates to apparatus for removing undesirable constituents of exhaust gases from combustion sources such as internal combustion engines or industrial processing equipment and the like.

Exhaust gases from internal combustion engines using hydrocarbon fuels contain a variety of gases such as carbon monoxide, oxides of nitrogen and unburnt hydrocarbons which are known to contribute in a large degree to air pollution, particularly in large metropolitan areas. The elimination of such exhaust pollutants has become one of the most challenging problems of modern civilization, and large amounts of time and money have been spent to provide a solution.

One object of the present invention is to provide a solution to the aforesaid by an apparatus that eliminates the undesirable constituents of the exhaust gases from combustion processes by ionizing them prior to release to the atmosphere.

Another object of the present invention is to provide an apparatus that wil leliminate pollutant constituents from an internal combustion engine exahust and is particularly adaptable for installation in a conventional automobile.

Another object of the present invention is to provide an apparatus for rendering engine exhaust gases harmless that will operate on a reliable basis with relative safety and without the need for frequent adjustments and maintenance.

Yet another object of the present invention is to provide an apparatus for removing pollutant gases from the exhaust stream of an automobile engine that can be constructed and installed with relative economy.

The aforesaid and other objects are accomplished by an elongated chamber which is adapted for connection at one end to a pipe extending from the source of combustion such as the exhaust manifold of an automobile engine. The chamber is lined on its inside surface with a heat resistant material and surrounding it are coils of an electrical conductor such as a copper tube. Applied to this conductor is high voltage, high frequency electrical energy which is generated through a circuit originally powered from the automobile's battery and associated generator. This energy creates an intense high frequency electrical field that ionizes the gases within the chamber when a plasma effect has been started by an ignitor device within the chamber. The ionizing action on the exhaust gases takes place as they flow into the chamber and a plasma of ionized gas is created thereon. As the plasma nears the outlet of the chamber it is cooled and the ions recombine as stable compounds and elements that are harmless to the atmosphere. Heat generated by the plasma within the chamber and transferred to the coolant may be utilized to produce auxiliary power for use elsewhere on the vehicle.

Other objects, advantages and features of my invention will become apparent from the following detailed description of one embodiment thereof presented with the accompanying drawing, in which:

FIG. 1 is a partially schematic view of an exhaust gas conversion apparatus embodying the principles of the present invention with an ionizing chamber shown in section; and FIG. 2 is a view in section taken along line 2—2 of FIG. 1.

With reference to the drawing, FIG. 1 shows somewhat diagrammatically an apparatus 10 embodying the principles of my invention which is particularly adaptable for installation in a conventional automobile. Generally, it comprises an elongated chamber 12 which is connected to an inlet pipe 14 from the exhaust manifold of the automobile engine 16. The chamber may have a diameter only slightly larger than a standard exhaust pipe and is formed by an elongated cylindrical housing 18 having an inner liner 20 with a high heat resistant quality such as quartz. The liner is spaced inwardly from the housing to form an annular space 22 between liner and housing. Within this space is a coil comprised of a plurality of helical turns of an electrical conductor 24, such as a heavy copper tubing. At the head end of the chamber is an annular front wall member 26 which fits around the exhaust pipe and provides an inlet 28 for the exhaust gases into the chamber. Preferably, this inlet has a convergent-divergent shape which causes a speed up of the incoming flow of exhaust gases and dispersion effect once they are inside the chamber. Surrounding this inlet with a larger diameter and extending a short distance axially into the chamber is an annular sleeve-like member 30 that forms an annular space 32 between its outer surface and the inner surface of the chamber. A series of small inlet passages 34 are provided through the front wall member 26 which exit within the annular space 32. These inlets are connected to a circular manifold in the wall member 26 to which may be supplied a stream of some combustion assisting gas such as hydrogen, oxygen or air scavenged from the atmosphere. Or, in the arrangement shown, an inlet pipe 36 to the circular manifold may tap some of the exhause gas from an upstream location 38. A valve 40 may be supplied in this line to control the rate of flow. The gas through these inlets 34 forms an annular sheath around the main inlet 28 which helps to control and cool the plasma within the chamber.

At the rear end of the chamber is an annular rear wall member 42 from which the plasma or the ionized gases produced therein may exit and be cooled before being released to the atmosphere. Fixed within the rear end of the chamber is a converging exit nozzle 44 which has internal passages 46 through which a coolant can be circulated. Both the front wall member and the rear wall member may be secured to the housing by machine screws 48 or some other suitable fasteners. Supplied to the coiled conductor 24 is electrical energy at a relatively high voltage and high frequency (e.g. 10,000 volts at 4 megahertz).

The means for producing this energy within an automobile is shown in block diagram form in FIG. 1. A standard battery 50 (i.e. 12 volts) is connected to an inverter unit 52 which converts the D.C. input of 12 volts to an A.C. output of 12 volts. This unit may be any suitable inverter which is commercially available, preferably an electronic type that is small and uses solid-state circuitry. The output from the inverter 52 is supplied to a transformer 54 which boosts the 12 volts A.C. to a much higher voltage (e.g. 10,000 volts A.C.). This transformer output is supplied to a rectifier 56, such as a conventional silicon controlled rectifier that changes the 10,000-volt A.C. to a 10,000-volt pulsating D.C. output. This latter output is now connected to an oscillator unit 58 which alters the 10,000 volts from a pulsating D.C. to a high frequency output (e.g. 4 megahertz). It is this high frequency, high voltage power that is connected and fed to the helical conductor 24.

The annular cavity 22 containing the conductor coils 24 may have an inlet 60 and an outlet 62 for a suitable coolant. The heat supplied to the coolant may be used to provide power for other systems or accessories on the automobile. For example, as shown in FIG. 1, the outlet 62 from the chamber cavity 22 is connected to a heat exchanger 64 which produces steam. Here, this steam is used to drive a generator 66 and also to operate an air conditioner 68. The coolant medium that flows from the heat exchanger after the heat has been removed is forced back through the chamber cooling cavity 22 by a pump 70. Other arrangements for utilizing the heat energy of the cooling medium could be utilized within the scope of the invention and the arrangement shown is not intended to be limiting.

In addition to the cooling provided along the chamber an additional cooling jacket 72 is provided at its exit end to circulate coolant through the exit nozzle 44 and a portion of exit pipe 74 to help the de-ionization process, that is, the reassociation of ions into the harmless gases of relatively low temperature which can be harmlessly released to the atmosphere. This jacket has a separate inlet 76 and a separate outlet 78 which can be connected to the same pump 70 and to the heat exchanger 64 used for the other coolant.

In the operation of the system illustrated, which is particularly adaptable for use in automobiles, the exhaust gases from the engine manifold flow directly to the chamber 12 as the engine is started. Simultaneously, the electrical system is energized and creates the high frequency electrical field around the chamber. To commence the ionizing process a graphite scepter 80 near the inlet 28 is also energized as the engine starts, and this initiates the ionizing or the plasma reaction. Thus, as the exhaust gases enter the chamber they are immediately ionized and a plasma plume 82 is formed within the chamber. Thus, gases such as carbon monoxide, and the various nitrogen gas compounds are either consumed or are ionized. Near the outlet end of the chamber the plasma of ions is cooled and recombined as stable compounds and elements, and only these non-polluting and harmless constituents are released to the atmosphere. Under normal operating conditions the exhaust from the internal combustion engine of an automobile leaves its manifold at around 1200° F. However, the temperature of the body of ionized gas of the plasma torch within the chamber may reach 10,000° F. This temperature of the plasma may be controlled or increased to a more efficient operating level by the use of a sheath gas supplied to the chamber through the inlets 34 in the space 32 around the sleeve 30. The flow of this sheath gas through these inlets is controlled by the valve 40. Since essentially all of the exhaust gases entering the chamber are ionized within the chamber and then recombined as stable compounds and gases such as nitrogen and oxygen, nothing can emerge from it to contribute to atmospheric pollution.

In addition to the elimination of air pollutants, the intense heat produced in the chamber and transferred to the coolant circulated around the chamber is according to the invention, utilized in various ways within the automobile system, as previously described.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. Apparatus for treating the gaseous and particulate components of an exhaust stream from a combustion process comprising housing means forming an elongated ionization chamber including an outer wall member, with one end wall having an inlet for receiving the exhaust stream and another end wall with outlet;
   an inner tubular member surrounded by said outer wall member and forming an annular space therebetween;
   means in said annular space surrounding said inner tubular member for producing a continuous, high intensity, high frequency electrical field in said chamber for ionizing gases therein;
   means near said inlet for helping to initiate the ionization process;
   and means near said outlet for removing heat from the output of the ionic plasma within the chamber to arrest the ionization process and thereby re-associate and recombine ions therein to harmless compounds and elements before they are released to the atmosphere.
2. The apparatus as described in claim 1 wherein outer housing forms an annular cavity through which a coolant can be pumped.
3. The apparatus as described in claim 1 including means forming a cooling jacket near the outlet of said chamber, and means for pumping a liqiud coolant through said jacket to lower the temperature of the output of the plasma within the chamber and cause re-association and recombination of the ions into harmless, non-polluting compounds and elements.
4. The apparatus as described in claim 1 including a tubular sheath member extending around said inlet and axially into said chamber, a series of orifices spaced circumferentially between said sheath member and said inner tubular member, and means for supplying additional gas through said orifices to help control the plasma within said chamber.
5. The apparatus as described in claim 4 wherein said orifices are connected by a conduit to the exhaust stream and controllable valve means in said conduit.
6. The apparatus as described in claim 1 wherein said means for helping to initiate the ionization process is a graphite scepter.
7. The apparatus as described in claim 1 wherein said means for producing a high intensity, high frequency electrical field in said chamber comprises a coil of an electrical conductor around said inner tubular member and connected to a high frequency R.F. oscillator.
8. In an automobile having a battery and an internal combustion engine with an exhaust pipe extending from the engine manifold, an exhaust gas control system comprising:
   an elongated housing including an outer wall forming a chamber therein, one end wall conected to said engine exhaust pipe and another end wall having an outlet conduit;
   means surrounding said chamber and powered by said battery for producing a high frequency electrical field therein which is sufficient to ionize the exhaust gases entering the chamber;
   and cooling means near the outlet of said chamber for cooling the output of the ionic plasma within the chamber and thereby re-associating the ions and re- combining them into compounds and elements which are non-polluting to the atmosphere.

9. The system as described in claim 8 including heat exchanger means from receiving heated coolant after it passes through said housing and for producing steam, and means for utilizing the steam from said heat exchanger to other components of the automobile.

10. The system as described in claim 8 wherein said cooling means includes a jacket means around said outlet conduit and pump means for circulating coolant through said jacket means.

11. The system as described in claim 8 when said end wall having an outlet end has a converging outlet orifice around which are passages through which said coolant can circulate.

12. The system as described in claim 8 wherein said means for producing a high frequency electrical field comprises an inverter connected to said battery, transformer means for stepping up the voltage from said inverter, rectifier means connected to said transformer and an oscillator interconnected between said rectifier and said conductor coil.

References Cited

UNITED STATES PATENTS

| | | | |
|---|---|---|---|
| 3,091,920 | 6/1963 | Matvay | 60—30 |
| 3,180,083 | 4/1965 | Heller | 60—30 |
| 3,296,410 | 1/1967 | Hedger | 219—121 P |
| 3,407,281 | 10/1968 | Greene | 219—121 P |
| 3,535,888 | 10/1970 | Eannarino | 62—238 |

FOREIGN PATENTS

| | | | |
|---|---|---|---|
| 644,759 | 10/1950 | Great Britain | 290—2 |

DOUGLAS HART, Primary Examiner

U.S. Cl. X.R.

23—277 C; 62—238; 219—121 P; 290—2